US010937419B2

(12) United States Patent
Fleurence et al.

(10) Patent No.: US 10,937,419 B2
(45) Date of Patent: Mar. 2, 2021

(54) CONTROL DEVICE AND METHOD WITH VOICE AND/OR GESTURAL RECOGNITION FOR THE INTERIOR LIGHTING OF A VEHICLE

(71) Applicant: VALEO VISION, Bobigny (FR)

(72) Inventors: Thierry Fleurence, Bobigny (FR); Aymeric Koniec, Villiers sur Marne (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/465,087

(22) Filed: Mar. 21, 2017

(65) Prior Publication Data
US 2017/0270924 A1   Sep. 21, 2017

(30) Foreign Application Priority Data

Mar. 21, 2016 (FR) ...................... 1652417

(51) Int. Cl.
*G10L 15/22* (2006.01)
*B60K 37/06* (2006.01)
(Continued)

(52) U.S. Cl.
CPC .............. *G10L 15/22* (2013.01); *B60K 35/00* (2013.01); *B60K 37/06* (2013.01); *B60Q 3/80* (2017.02);
(Continued)

(58) Field of Classification Search
CPC .......... G06F 3/017; G06F 3/167; G06F 3/011; G06F 3/0304; G06F 3/0425;
(Continued)

(56) References Cited

U.S. PATENT DOCUMENTS 6,285,924 B1 * 9/2001 Okamoto ........... G01C 21/3629
701/1
8,248,219 B2 * 8/2012 Sato ......................... B60Q 9/00
340/425.5
(Continued)

FOREIGN PATENT DOCUMENTS

EP    2 746 805 A1    6/2014
EP    2 977 264 A2    1/2016
WO   WO 2013/174580 A1    11/2013

OTHER PUBLICATIONS

French Preliminary Search Report dated Dec. 13, 2016 in French Application 16 52417, filed on Mar. 21, 2016 (with English Translation of Categories of Cited Documents).

*Primary Examiner* — Abdelali Serrou
(74) *Attorney, Agent, or Firm* — Oblon, McClelland, Maier & Neustadt, L.L.P.

(57) ABSTRACT

The invention relates to a control device with voice and/or gestural recognition for the interior lighting of a motor vehicle comprising a plurality of lighting modules ($M_n$) each capable of emitting at least one light beam in an interior of the vehicle. The device includes at least distinct means ($C_n$) for detecting a plurality of voice and/or gestural commands ($S_n$), executed by at least one occupant of the vehicle in specific zones ($Z_n$) of the vehicle interior targeted by the detection means, the detection means ($C_n$) being capable of transmitting data representative of the commands ($S_n$) to at least processing and analysis means (ECU) configured to merge and prioritize the data and generate, after comparison with reference data, at least one instruction ($A_n$) to at least one interior lighting module ($M_n$).

19 Claims, 2 Drawing Sheets

(51) Int. Cl.
*B60K 35/00* (2006.01)
*B60Q 3/80* (2017.01)
*G06F 3/01* (2006.01)
*G06K 9/00* (2006.01)
*H04L 29/08* (2006.01)
*H04N 7/18* (2006.01)

(52) U.S. Cl.
CPC ......... *G06F 3/017* (2013.01); *G06K 9/00335* (2013.01); *H04L 67/12* (2013.01); *H04N 7/183* (2013.01); *B60K 2370/146* (2019.05); *G10L 2015/223* (2013.01)

(58) Field of Classification Search
CPC .... G06F 3/04883; G06F 1/163; G06F 3/0481; G06F 3/04842; G06F 3/038; G06F 2203/0381; G06F 3/012; G06F 3/013; G06F 3/147; G06F 17/2247; G06F 17/2264; G06F 17/2775; G06F 17/28; G06F 3/04815; G06F 3/04817; G06F 17/30029; G06F 2203/04806; G06F 3/005; G06F 3/015; G06F 3/0346; G06F 3/0487; G06F 8/35; G06F 8/37; G06F 17/30038; G06F 17/30843; G06F 21/36; G06F 3/03547; G06F 3/165; G06F 19/20; G06F 21/35; G06F 2203/0384; G06F 3/016; G06F 3/0354; G06F 3/0482; G06F 3/0484; G06F 3/04845; G06F 3/0485; G06F 3/0488; G06F 3/04886; G06F 3/14; G06F 17/243; G06F 17/2785; G06F 17/30646; G06F 17/30976; G06F 17/30991; G06F 1/1626; G06F 1/1632; G06F 1/166; G06F 1/1673; G06F 2200/1633; G06F 2203/04808; G06F 3/01; G06F 3/0227; G06F 3/0325; G06F 3/033; G06F 3/0416; G06F 3/0426; G06F 3/048; G06F 9/541; G10L 15/22; G10L 2015/223; G10L 15/24; G10L 15/142; G10L 15/265; G10L 15/08; G10L 15/19; G10L 15/26; G10L 15/25; G10L 2015/226; G10L 2021/065; G10L 21/10; G10L 13/00; G10L 15/1815; G10L 15/1822; G10L 17/22; G10L 2015/088; G10L 25/63; G10L 13/033; G10L 15/04; G10L 15/16; G10L 15/183; G10L 15/193; G10L 15/30; G10L 15/32; G10L 2015/227; G10L 15/10; G10L 15/18; G10L 15/02; G10L 15/063; G10L 15/1807; B60Q 1/20; B60Q 3/80; G06K 9/00335; B60K 37/06; B60K 35/00; B60K 2370/146; H04N 7/183; H04L 67/12

See application file for complete search history.

(56) References Cited

U.S. PATENT DOCUMENTS

| | | | | |
|---|---|---|---|---|
| 9,349,365 | B2* | 5/2016 | Rajagopal | G10L 15/01 |
| 9,798,799 | B2* | 10/2017 | Wolverton | G06F 16/3329 |
| 9,802,535 | B2* | 10/2017 | Line | B60Q 3/233 |
| 2004/0189720 | A1* | 9/2004 | Wilson | G06K 9/00355 |
| | | | | 715/863 |
| 2004/0193413 | A1* | 9/2004 | Wilson | G06F 3/017 |
| | | | | 704/243 |
| 2005/0024342 | A1* | 2/2005 | Young | B60K 35/00 |
| | | | | 345/173 |
| 2006/0047386 | A1* | 3/2006 | Kanevsky | B60K 35/00 |
| | | | | 701/36 |
| 2010/0066137 | A1* | 3/2010 | Sakai | B60N 2/002 |
| | | | | 297/217.3 |
| 2012/0105257 | A1* | 5/2012 | Murillo | G06F 9/451 |
| | | | | 341/20 |
| 2012/0278729 | A1* | 11/2012 | Vennelakanti | G06F 3/0481 |
| | | | | 715/750 |
| 2012/0283894 | A1* | 11/2012 | Naboulsi | B60R 11/0264 |
| | | | | 701/1 |
| 2013/0045683 | A1* | 2/2013 | Wang | H04B 5/0031 |
| | | | | 455/41.2 |
| 2013/0088147 | A1 | 4/2013 | Nakamura | |
| 2013/0145360 | A1* | 6/2013 | Ricci | H04W 4/90 |
| | | | | 717/174 |
| 2013/0265448 | A1* | 10/2013 | Li | H04N 5/4403 |
| | | | | 348/207.1 |
| 2013/0330008 | A1* | 12/2013 | Zadeh | G06N 7/02 |
| | | | | 382/195 |
| 2014/0177393 | A1* | 6/2014 | Menne | G01S 15/00 |
| | | | | 367/89 |
| 2014/0197757 | A1 | 7/2014 | Heinrich | |
| 2014/0247322 | A1* | 9/2014 | Baldwin | H04N 7/152 |
| | | | | 348/14.08 |
| 2014/0278442 | A1* | 9/2014 | Hong | G01C 21/3608 |
| | | | | 704/275 |
| 2014/0298212 | A1* | 10/2014 | Wen | G06F 3/04847 |
| | | | | 715/762 |
| 2014/0309871 | A1* | 10/2014 | Ricci | B60Q 1/00 |
| | | | | 701/36 |
| 2015/0336588 | A1* | 11/2015 | Ebner | G01C 21/3664 |
| | | | | 701/2 |
| 2015/0367776 | A1* | 12/2015 | Salter | H05B 37/0218 |
| | | | | 362/510 |
| 2016/0023611 | A1* | 1/2016 | Huelke | B60R 7/10 |
| | | | | 224/486 |
| 2016/0098088 | A1* | 4/2016 | Park | G06K 9/00355 |
| | | | | 345/156 |
| 2017/0032783 | A1* | 2/2017 | Lord | G10L 15/22 |
| 2017/0205889 | A1* | 7/2017 | Ng | G06F 3/017 |

* cited by examiner

CONTROL DEVICE AND METHOD WITH VOICE AND/OR GESTURAL RECOGNITION FOR THE INTERIOR LIGHTING OF A VEHICLE

FIELD OF THE INVENTION

The present invention relates to a control device and method with voice and/or gestural recognition for the interior lighting of a vehicle in which the communication between the elements can be performed via a multiplexed network.

DISCUSSION OF RELATED ART

Electronics are becoming increasingly commonplace in motor vehicles, and increasingly sophisticated. The electronics are thus used now as support for most of the vehicle functions, such as an engine management system, an active and passive safety system (antilock braking system ABS, electronic stability program ESP, emergency braking AFU, airbags, seat belts, reversing radars, antitheft) or even a comfort system (air conditioning, locking, onboard computer, navigation).

The electronics are thus enabling the development of autonomous and communicating vehicles in which there is an exchange of information between the occupant and the vehicle through the use of touch or voice interfaces. Some vehicles can provide gestural recognition systems for active safety applications of the vehicle such as driver vigilance tracking. These systems are capable of detecting and analyzing the movements of the head, of the face and of the eyes of the driver such as, for example, the opening of the eyelids, the position of the pupils, the direction of gaze, the position and the inclination of the head. The system, consisting of a detection unit, a computation unit and software, is then capable of determining the level of vigilance and of distraction or the state of drowsiness of the driver and can, consequently, transmit a falling-asleep or distraction alert in real time.

The process associated with such a gestural recognition system comprises at least a step of detection and of collection of data, a step of comparison of the information obtained to reference data then a step of controlling and/or monitoring safety functions of the vehicle. In response to a loss of vigilance or a diversion of the attention of the driver, the embedded systems can intervene on the control of the vehicle by proposing, for example, lane holding assistants, full power automatic braking, a regulation of the speed or piloting assistance.

The increase in the electronic functions of the engine management, safety and comfort systems cited previously causes the number of computers, sensors and bundles of electric cables to be increased. In this context, the use of a multiplexed network is known, making it possible to limit the number of components, the bulk of the wiring and the associated cost. Such a multiplexed network consists in having a plurality of information circulate between various computers over a single transmission channel, also called data bus. These multiplexed networks are known by the designations "Controller Area Network" or CAN, "Vehicle Area Network" or VAN and "Local Interconnect Network" or LIN.

SUMMARY OF THE INVENTION

In this dual context of driver command recognition and of multiplication of the electronic components in the vehicle, the aim of the invention is to propose a device capable of detecting, analyzing and prioritizing a plurality of interior lighting voice and/or gestural recognition commands in which the communication between the elements, in particular the transmission of the instructions to the lighting modules, can be performed via a multiplexed network. The device according to the invention reinforces the safety of the occupants of the vehicle by giving priority to the commands executed by the driver and by not disturbing the vigilance thereof which remains concentrated on the trajectory of the vehicle. The comfort and the wellbeing of the occupant are also enhanced.

The subject of the invention is a device for controlling interior lighting of a motor vehicle comprising at least two light sources each capable of emitting at least one light beam in the vehicle interior. The device comprises at least distinct means for detecting a plurality of commands, these detection means being capable of transmitting data representative of said commands to at least processing and analysis means configured to merge and prioritize said data and generate, after comparison with reference data stored in a database, at least one instruction to at least one of the light sources for the activation thereof.

DETAILED DESCRIPTION OF THE INVENTION

Figure 1:
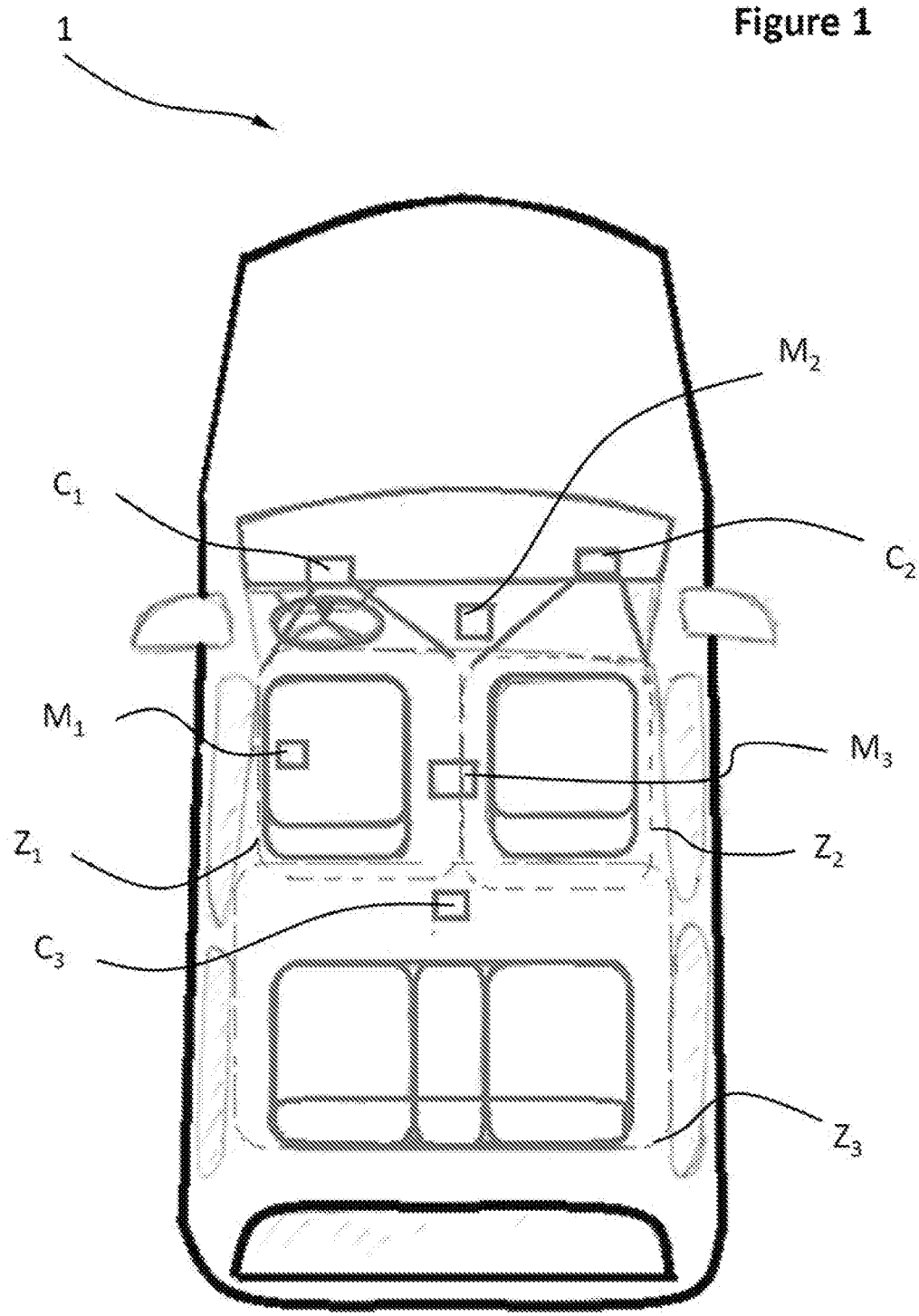
FIG. 1 is a schematic view of a control device with voice and/or gestural recognition for the interior lighting of a vehicle according to an embodiment.

The light sources are distinguished in that they are configured to emit a particular light beam relative to one another, or a part of a light beam. In particular, these light sources can consist of one or more sources arranged in distinct lighting modules, or else can be formed by a light-emitting diode of RGB type, namely three chips, red, green and blue. It is also possible to provide, without this list being exhaustive, a matrix of light-emitting diodes to produce a selective lighting.

The detection means can be configured to detect a plurality of voice and/or gestural commands, executed by at least one occupant of the vehicle in specific zones of the vehicle interior targeted by the detection means.

According to a feature of the invention, the interior lighting commands are gestural commands consisting of a plurality of gestures forming a determined gestural sequence. A gestural sequence should be understood to be a succession of gestures defined by the movement of all or part of the body of at least one occupant, preferably of an upper member of an occupant, preferably of the driver, each upper limb consisting of three segments: arm, forearm and hand. A gestural sequence is detected when, at regular, advantageously very short, intervals, a different position of the part of the body detected to be in motion is recorded.

A gestural sequence is primarily defined by a trajectory executed in an active detection zone of the vehicle interior, according to a vertical, horizontal or diagonal orientation, in one direction or in the other.

The orientation of the sequence of gestures, that is to say the line and the direction that can be determined by placing all the positions of the part of the body detected end-to-end, makes it possible to determine a switching-on or a switching-off of a light source and/or a corresponding orientation of all or part of the lighting module to displace the beam accordingly.

The speed of execution of the gestural sequence can also be taken into account. It will be understood that, depending on the quantity of lighting modules to be activated and their positioning in the vehicle interior, many combinations of gestures associated with specific detection zones can be created so as to form a functional gestural language.

Similarly, an active detection zone should be understood to be a zone of the vehicle interior that can be equally defined by one or more planar surface(s), in two dimensions (2D), and by one or more volume(s) in three dimensions (3D). The active detection zone can broadly cover the vehicle interior, being centered on the median axis of the vehicle interior, or else, to improve the definition of the images taken in the zone, be targeted on a part of the vehicle interior in which an occupant has been detected, and notably on the part of the vehicle interior associated with the driver. Preferably, the command detection means are targeted on three distinct specific zones: the driver zone, the front passenger zone, the rear passenger zone.

The detection means can notably comprise means for acquiring, from a network, data conveying voice and/or gestural commands. The network can consist of a network embedded on the vehicle, either a wireless network for example of Bluetooth, WiFi, Lifi type or a wired network of CAN or LIN type, or else it can consist of a wireless network external to the vehicle.

More particularly, it will be possible to provide for a control device according to the invention to comprise at least
- a plurality of command detection modules, which can be distinct from one another by their operation and by their location in targeted specific zones of the vehicle interior, each module being configured to at least detect an interior lighting command executed by at least one occupant of the vehicle in at least one of said specific zones, analyze this command and transmit data representative of said command,
- an electronic control unit known as ECU linked to said command detection modules and configured to receive, process and analyze a plurality of data representative of a plurality of commands, and transmit at least one resulting instruction to at least one lighting module, it being understood that this instruction could consist of a switch-on and/or switch-off instruction and/or an instruction to vary the light intensity and/or to orient a beam emitted by the at least one lighting module,
- upstream communication means, configured to circulate data representative of at least one interior lighting command transmitted by at least one detection module to the electronic control unit ECU, said communication means being able to form a wireless network, preferably of Bluetooth type, a wired network or a multiplexed network,
- and downstream communication means, configured to circulate at least one instruction output from the electronic control unit ECU to at least one light source, said communication means forming a multiplexed network, preferably of CAN and/or LIN type.

In addition to the above, it will be possible to provide for the electronic control unit to be configured to merge and synthesize the data representative of a plurality of commands into one or more resulting instructions. And it could also, in combination with or independently of the above, be configured to compare the data representative of a plurality of commands with reference data and determine whether conditions for triggering a lighting function are met.

The electronic control unit could also prioritize the data from the different detection modules, and to establish one or more resulting instructions on the basis of a selection of these data, for example in order to prioritize, for safety reasons, the command executed by the driver.

The light sources for the interior lighting of the vehicle can be configured to ensure a functional lighting and/or an ambiance lighting and/or a lighting for projecting information.

Functional lighting should be understood to be a lighting that improves the visibility of specific zones of the vehicle interior. To this end, it will be possible to provide at least one light source, in particular, consisting of at least one light-emitting diode LED, which can be housed, for example, in the dome light block for a directional lighting of reading type.

Ambiance lighting should be understood to be a lighting of lower intensity making it possible to highlight details of the vehicle interior, for example the outline of the dashboard and of the doors, or decorate specific zones such as the ceiling of the vehicle. To this end, it will be possible to provide at least one light source formed by a matrix of light-emitting diodes that can be activated selectively and housed, for example, in the dome light block.

Lighting for projecting information should be understood to mean the projection of a light beam onto a neutral support via a light source independent of the support. As an example, a projector may, using diodes, project, onto the windshield, information relating to the speed and to the navigation of the vehicle (fuel level, traffic, mechanical fault alerts).

The detection means consist of at least one module for detecting an interior lighting command capable of detecting, capturing and recording any interior lighting command, gestural and/or voice, executed by at least one occupant of the vehicle in at least one specific zone of the vehicle interior, analyze this command and transmit data representative of said command.

Each detection module can be configured to record a plurality of commands for which the sequence in which they are performed forms the interior lighting command. The recording of data thus makes it possible to reconstruct the sequence of successive images forming the command, and also makes it possible to simplify the management of a database of reference gestural commands serving as comparison base for determining whether conditions for triggering the lighting command are met.

According to an advantageous feature of the invention the module for detecting and, if appropriate, recording commands with voice and/or gestural sequence of the control device according to the invention is oriented toward at least one active detection zone of the interior of the vehicle and consists of at least one detection means capable of detecting and, if appropriate, recording at least one voice message and/or one directional movement or gesture of at least one occupant of the vehicle in said active detection zone and/or, in the case of a gestural command, at least one image acquisition means capable of capturing and of recording a sequence of images corresponding to the gestural sequence detected by said detection means.

In the case of a gestural command the image acquisition means is activated when a movement and/or gesture is detected by the detection means in the active detection zone in order to avoid having the image acquisition means operate continuously and in an energy-consuming manner. It will be possible to envisage having the control device include no detection means, it being understood that this means has a function for detecting a gesture initiating a sequence of gestures to be acquired thereafter. In this case, images are taken continuously on the detection zone and the acquired images are all processed.

In the case of a command by gestural recognition, the gestural sequence detection and recording module can comprise a single image acquisition means, oriented on a single active detection zone so that the driver is the only one capable of interacting with the gestural recognition control device or else comprise a plurality of image acquisition means, oriented on one or more active detection zone(s), such that all of the occupants of the vehicle are capable of interacting individually with the gestural recognition control device.

The vehicle interior is, preferably, equipped with a plurality of command detection and recording modules targeted on a plurality of specific active detection zones such that all of the occupants of the vehicle are capable of interacting individually with the control device according to the invention.

The voice or gestural command detection means can consist of any type of sensor and/or camera, capable of detecting at least a voice sequence or a movement or gesture of an occupant of the vehicle in a predefined active detection zone. As a nonlimiting example, the sensor can be, in the case of a voice command, a microphone capable of picking up the human voice while reducing the ambient noise to correctly hear the commands. In the case of a gestural command, the sensor can be an infra-red and/or ultrasound and/or radar-type sensor. The detection means will be able to comprise a plurality of sensors of different types, and one or other of the sensors will be able to be chosen on the basis of information received concerning the brightness conditions by the control module.

The image acquisition means of the gestural sequence detection and capture module consists of any 2D or 3D image capture means, source of images and/or of videos, said means being capable of capturing, generating and recording 2D or 3D fixed or directional gestural sequences executed in a specific active detection zone. As a nonlimiting example, the image capture means consists of one or more camera(s) and/or still camera(s). A camera should be understood, for example, to be a thermal-imaging camera and/or a camera for visible light and/or an infrared camera that can operate at any level of light intensity in the vehicle interior and/or laser camera and/or a radar.

In the case of a gestural command, the data acquired and generated by the gestural sequence detection and recording module consist of representative data defining one-, two- or three-dimensional geometrical forms and/or data representing at least a position or trajectory of the part of the body detected in an active detection zone. "Boxes" are thus defined in which the presence of a determined part of the body is identified, and the displacement of the succession of "boxes" corresponding to the displacement of the part of the body detected is analyzed.

In a preferred embodiment of the invention, the vehicle interior is equipped with a plurality of detection modules distinct from one another, both by their operation and by their location and/or orientation. More specifically, the detection modules differ from one another in as much as they consist of sensors of different technological nature (microphone, motion detection, camera, etc.), capable of detecting a plurality of commands of different nature (voice or gestural). Said detection modules can differ also from one another by the fact that they can be fixed and/or mobile. Fixed detection module should be understood to convey embedded sensors and/or cameras, permanently incorporated in the vehicle interior. Mobile detection modules should be understood to convey sensors and/or cameras incorporated in an independent multimedia device, for example a cellphone, arranged and connected in the vehicle interior by an occupant of the vehicle. It will be understood that said detection modules differ from one another by their location in the vehicle since they are incorporated in distinct specific zones of the vehicle interior and targeted on active detection zones.

The heterogeneous nature of the detection modules results in a diversification of the communication links between the elements of the device according to the invention. A distinction will be made between the cable technologies associated with the embedded elements (wired and/or multiplexed communication, for example of CAN/LIN type) and the wireless technologies, associated with the mobile elements (for example Bluetooth communication).

The data acquired and generated by the plurality of detection modules constitute data representative of at least one voice and/or gestural sequence executed by at least one occupant of the vehicle, said representative data are transmitted to the electronic control unit ECU of the control device according to the invention via a wireless and/or wired and/or multiplexed communication network.

According to an advantageous feature of the invention, the electronic control unit ECU of the interior lighting control device is a central data processing unit connected, upstream, to a plurality of voice and/or gestural command detection and recording modules and, downstream, to a plurality of interior lighting modules.

The principle of operation of the electronic control unit of the control device according to the invention is based on the interdependence that exists between a plurality of voice and/or gestural sequences executed by at least one occupant of the vehicle, preferably by an upper limb of said occupant, detected in a plurality of specific active detection zones of the vehicle interior and a plurality of vehicle interior lighting activation functions.

According to this principle of operation, the electronic control unit ECU is configured to perform at least one of the following steps:

receiving a plurality of data representative of at least one voice and/or gestural sequence detected and recorded by at least one voice and/or gestural command detection and recording module, processing and analyzing said data representative of the voice sequence and/or relating to the one-, two- or three-dimensional geometrical form and/or to the position of the gestural sequence, aggregating said data representative of a plurality of command sequences and originating from heterogeneous sources, in order to obtain merged and synthesized representative data, comparing the merged representative data to reference data stored in a database, determining whether said voice and/or gestural sequences recorded are similar to at least one of the reference sequences and whether this similarity makes it possible to meet the conditions for triggering a lighting function, arbitrating and prioritizing the data in case of conflicting and concomitant commands executed by a plurality of occupants in order to prioritize, for safety reasons, the command executed by the driver, selecting, generating and transmitting, as output (downstream), at least one activation instruction to at least one lighting module, said instruction being the one most appropriate to the safety of the vehicle.

In order to obtain the activation of at least one lighting module by gestural command, an occupant of the vehicle moves all or part of one of his or her upper limbs and executes, deliberately and specifically, a gestural sequence in a specific active detection zone of the vehicle interior. By virtue of the steps of detection, analysis, comparison and control specific to the control device according to the invention, any other spurious movement remains ineffective on the activation of the lighting modules.

According to an advantageous feature, the electronic control unit ECU has a capacity for learning new voice and/or gestural sequences, which can be recorded in order to feed the database with new reference sequences.

As was able to be specified previously, the heterogeneous nature of the detection and recording modules results in a diversification of the communication links between the elements of the device according to the invention. A distinction will then be drawn between the upstream communication means and the downstream communication means. The upstream communication means are configured to circulate data representative of at least one interior lighting command generated and transmitted by at least one embedded and/or mobile detection and recording module to the input of the electronic control unit ECU. Said upstream communication means form a wireless communication network, preferably of Bluetooth type, and/or wired and/or multiplexed communication network preferably of CAN type. The downstream communication means are configured to circulate at least one instruction output from the electronic control unit ECU to at least one lighting module and form a multiplexed communication network, preferably of CAN and/or LIN type.

According to a feature of the invention, the upstream and downstream communication means can consist of a common multiplexed network.

The invention relates also to a control method with voice and/or gestural recognition for the interior lighting of a motor vehicle during which, following a voice and/or gestural command from at least one occupant in a specific detection zone of the vehicle interior, at least the following steps are carried out in succession:
  a step of detection of at least a voice sequence and/or of two-dimensional and/or three-dimensional images of a gestural sequence,
  a step of analysis of the voice signal and/or of images to generate data representative of at least one voice and/or gestural sequence detected,
  a step of transmission of said representative data to at least one electronic control unit ECU, via a communication network,
  a step of processing of said data representative the voice and/or gestural command,
  a step of transmission, if the triggering conditions are met, via a multiplexed communication network, of at least one control instruction for a lighting module, and in particular a switch-on and/or switch-off instruction and/or an instruction to vary the light intensity of a light beam emitted in the vehicle interior by at least one interior lighting module incorporated in the vehicle.

It will be possible to provide for the processing step to comprise at least one of the following steps:
  a step of analysis of said data relating to the voice sequence and/or one-, two- or three-dimensional geometrical form and/or to the position and/or to the trajectory of said gestural sequence,
  a step of merging of said related data in order to obtain merged representative data,
  a step of comparison of said merged representative data relating to said recorded voice and/or gestural sequence with at least one reference voice and/or gestural sequence stored in a database,
  a step making it possible to determine whether conditions for triggering a lighting function are met,
  a step of prioritization of the merged representative data in case of conflicting and concomitant commands executed by a plurality of occupants in order to prioritize, for safety reasons, the command executed by the driver.

According to an advantageous feature, the control method can comprise a step of learning of at least one new reference voice and/or gestural sequence. This learning step can be performed according to an iterative process during which the user repeats a same voice and/or gestural sequence in order for the electronic control unit ECU to be able to synthesize and generate a mean voice signal and/or mean motion defining a new reference voice and/or gestural sequence.

Moreover, and in the case of a command with gestural recognition, it is possible to implement, in the analysis step, a gestural sequence detection means and an image acquisition means that are distinct and capable of interacting with one another, said image acquisition means being implemented only when the detection means has detected the beginning of a gesture that may initiate a gestural sequence.

In an alternative to this latter embodiment, provision can be made to implement, in the analysis step, an image acquisition means which continuously recovers images targeted on the detection zone.

Figure 2:
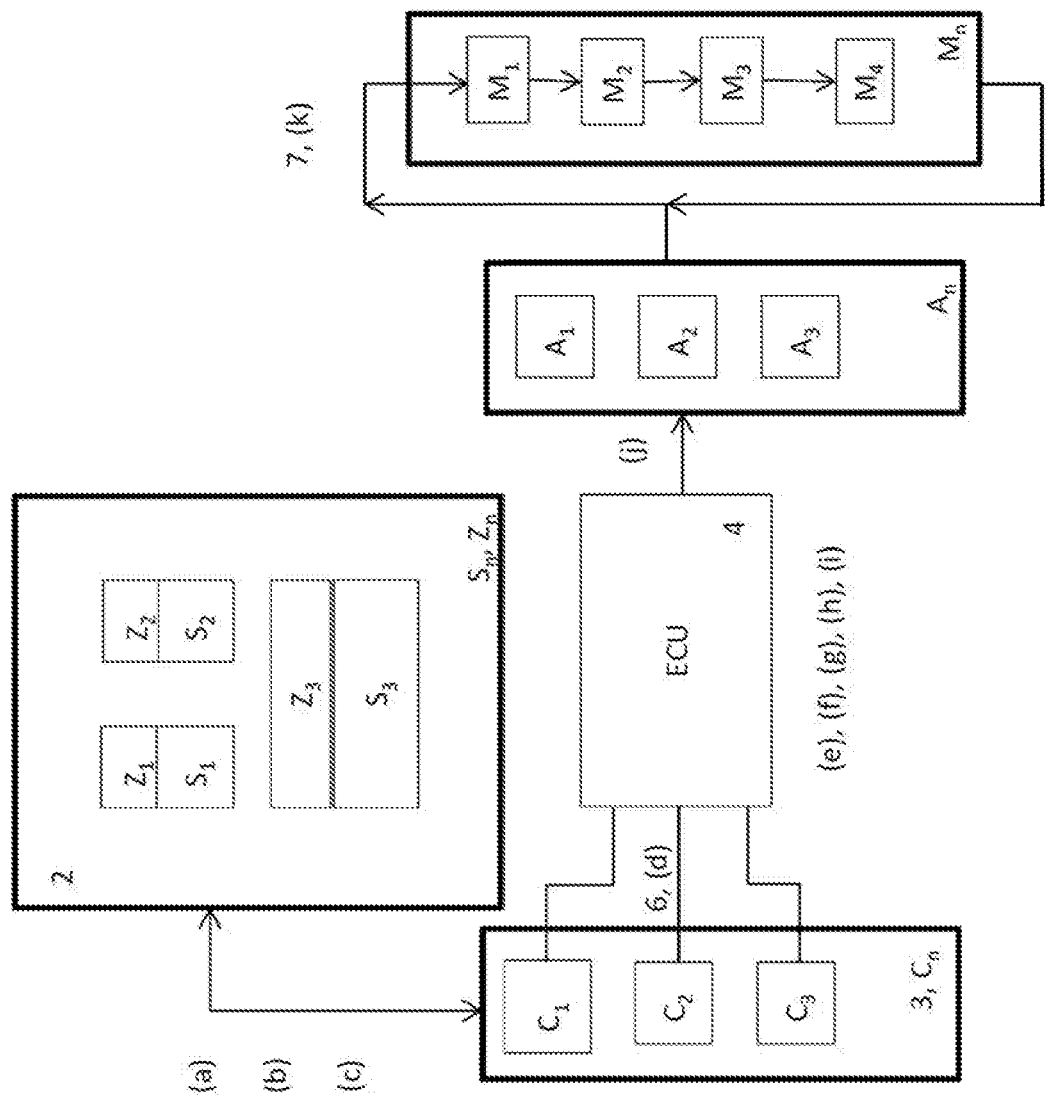
FIG. 2 is a schematic view of an example process method associated with the control device of FIG. 1 according to an embodiment.

Other features and advantages of the invention will emerge more clearly on reading the detailed description of an embodiment of the invention, given as an illustrative and nonlimiting example and based on the figures which illustrate the control device with voice and/or gestural recognition for the interior lighting of a vehicle according to the invention (FIG. 1) and the associated method (FIG. 2).

A control device with voice and/or gestural recognition for the interior lighting of a vehicle 1 comprises a plurality of light sources each capable of emitting at least one light beam. In the case described hereinbelow, these light sources are arranged in a plurality of lighting modules $M_n$ configured to ensure a functional lighting and/or an ambiance lighting and/or a lighting for the projection of information. The device further comprises distinct detection means $C_n$ targeted on a plurality of specific zones $Z_n$ of the vehicle interior. Said detection means $C_n$ are capable of detecting a plurality of commands formed by determined sequences $S_n$ executed by at least one occupant of the vehicle in at least one specific zone $Z_n$ of the vehicle interior, and in particular voice and/or gestural sequences.

The functional lighting modules, for example of reading type, can comprise at least one light source-forming light-emitting diode LED housed, for example, in the dome light block and/or in each of the specific zones $Z_n$ of the vehicle interior.

The ambiance lighting modules can for example consist of a matrix of light-emitting diodes that can be activated selectively, said matrix of diodes being housed in the dome light block.

The lighting module for the projection of information can consist of a projector whose light source is located, for example, in the dome light block.

The device according to the invention also comprises an electronic control unit ECU configured to respond to a plurality of input data representative of the sequences $S_n$ detected, recorded and generated by the plurality of sensors $C_n$, identifying the situation based on multiple variables detected and selecting at least one instruction $A_n$ to activate at least one interior lighting module $M_n$, which must be the one most appropriate to the safety of the vehicle. The electronic control unit ECU analyzes multiple predetermined inputs to determine the lighting function to be controlled.

The electronic control unit ECU comprises, at least, a processor, data processing and analysis means, computation means, a memory and a data storage means. The data storage means comprises the database containing the reference voice and/or gestural sequences, the activation instructions for the lighting functions that can be executed by the processor and any data reception and transmission instruction.

FIG. 1 illustrates, by way of example, a configuration of the device according to the invention in which three specific zones of the vehicle interior are defined: a driver zone $Z_1$, a front passenger zone $Z_2$, a rear passenger zone $Z_3$. Each zone has associated with it at least one voice and/or gestural sequence detection module $C_1$, $C_2$, $C_3$ consisting of at least one sensor, which can be, for example, a microphone and/or a motion detector and/or an IR camera and/or a cellphone camera and at least one interior lighting module $M_1$, $M_2$, $M_3$, which can be, for example, a reading light and/or a dome light block and/or an RGB (Red Green Blue) LED source and/or an LED matrix.

In the case of a voice command, the acquisition of the voice sequences can be performed by a detection, and if appropriate recording, module, of microphone type. A plurality of voice messages makes it possible to switch on, switch off and/or modify the light intensity of a plurality of lighting modules $M_n$ associated with a plurality of detection zones $Z_n$. The voice signal picked up is then digitized using an analog-digital converter.

In the case of a voice recognition command, the gestural sequence detection, and if appropriate recording, module can consist of one or more means for detecting a gestural sequence and one or more image acquisition means. These constituent elements of the detection module interact and communicate with one another so as to detect, capture, record at least one gestural sequence executed, in a specific active detection zone of the vehicle interior, by at least one occupant of the vehicle.

The image acquisition means can be arranged independently of the detection means in the vehicle interior, it being understood that at least one detection means and one image acquisition means are configured to target the same part of the vehicle interior. It will be understood that the benefit of a decoupling of these two means is to control the switching on of the image acquisition means only when the detection means have recorded the beginning of a motion that may correspond to a gestural sequence. Having the image acquisition means operate continuously is thus avoided. However, as was specified previously, it would be possible to use only a single device combining the detection means and the image acquisition means.

A gestural sequence is defined by a vertical, horizontal and/or diagonal trajectory executed in one active detection zone. The speed of execution of the gestural sequence can also be taken into account to distinguish a simple gesture, a so-called fixed gestural sequence, from a motion, a so-called directional gestural sequence.

Depending on the quantity of lighting modules $M_n$ to be activated and on their positioning in the vehicle interior, numerous combinations of gestures associated with specific detection zones $Z_n$ can be created so as to form a functional gestural language for the purpose of switching on, switching off and/or modifying the light intensity of a lighting module $M_n$.

Together, these voice and/or gestural combinations constitute the reference sequences on the basis of which the electronic control unit ECU will analyze and compare the data representative of the voice and/or gestural sequences executed by at least one occupant. These reference sequences are, preferably, learned and reproduced by the occupant in order to activate and control a lighting module. The acquisition and the storage of any new reference sequence, developed by an occupant of the vehicle, by the control device with voice and/or gestural recognition 1, in particular by the electronic control unit ECU, is also possible.

The control method according to the invention has been explained previously, and reference will be made to FIG. 2 to detail it in other terms. The control method is based on the interdependency that exists between a plurality of voice and/or gestural sequences $S_n$, a plurality of active detection zones $Z_n$ and a plurality of activation functions $A_n$ for the lighting of the vehicle interior and on the mutual connection and communication of the constituent elements of the control device 1.

The method first of all comprises a step of detection (a), in at last one detection zone $Z_1$, $Z_2$, $Z_3$ of the vehicle interior 2, of an initiation of at least one voice and/or gestural sequence $S_1$, $S_2$, $S_3$ performed by at least one occupant of the vehicle, this step (a) being performed by at least one voice and/or gestural command detection module $C_1$, $C_2$, $C_3$. This detection step (a) can be followed by a step of capture and of recording (b) of voice data and/or of 2D and/or 3D images of said voice and/or gestural sequences performed by the gestural sequence detection module $C_1$, $C_2$, $C_3$ and, in the case of a gestural sequence, preferably by at least one image acquisition means.

There is then a subsequent step of generation (c) of data representative of said voice and/or gestural sequences by the gestural sequence detection and capture module $C_1$, $C_2$, $C_3$. In the case of a gestural command, said representative data constitute data defining one-, two- or three-dimensional geometrical forms and/or data representing at least one position or trajectory in an active detection zone, for example a point or cloud of points.

There is then a communication between the voice and/or gestural sequence detection module $C_1$, $C_2$, $C_3$ and the electronic control unit ECU, through a step of transmission (d) of said representative data to the electronic control unit ECU, via a wireless (Bluetooth) and/or wired and/or multiplexed (CAN) upstream communication network 6. This communication then generates various successive steps, including:

a step of analysis (e) of said data relating to the voice sequence and/or one-, two- or three-dimensional geometrical form and/or to the position and/or to the trajectory of said gestural sequence, a step of merging (f) of said related data in order to obtain merged representative data, it being understood that the merging of data can consist, by way of example, in taking into account gestural sequences performed simultaneously by several occupants of the vehicle, or else in taking into account several data emanating from different detection means, for the detection of one and the same gesture from an occupant;

a step of comparison (g) of said merged representative data relating to said recorded voice and/or gestural sequence with at least one reference voice and/or gestural sequence stored in a database, a step making it possible to determine (h) whether the conditions for triggering a lighting function are met, a step of prioritization (i) of the merged representative data in case of conflicting and concomitant commands executed by a plurality of occupants in order to prioritize, for safety reasons, the command executed by the driver, if the triggering conditions are met, it is possible to provide, at the same time, or with a slight time offset, a step of transmission (j) and of execution (k), via a downstream multiplexed communication network 7 (CAN/LIN), of at least one instruction $A_1$, $A_2$, $A_3$ to switch on and/or switch off and/or vary the light intensity of a light beam emitted in the vehicle interior 2 by at least one interior lighting module $M_1$, $M_2$, $M_3$, $M_4$ incorporated in the vehicle, such as, for example, a reading light, a dome light block, an RGB LED, an LED matrix.

Furthermore, the control method can include a step of learning (k) of at least one new reference voice and/or gestural sequence. Thus, the control device with voice and/or gestural recognition and the associated control method can be adapted to new functionalities of the interior lighting device, by adapting the database of the electronic control unit.

The invention claimed is:

1. A control device with voice and gestural recognition for an interior lighting of a motor vehicle comprising at least two lights each configured to emit at least one light beam in the interior of the motor vehicle, the control device comprising:

at least one detector configured to detect a plurality of voice and gestural commands from a driver of the vehicle: and an electronic controller configured to receive data representative of said voice and gestural commands from the driver of the motor vehicle transmitted by the at least one detector, merge and prioritize said data over other data generated by other voice and gestural commands from at least one other vehicle occupant that are simultaneous with the voice and gestural commands from the driver of the motor vehicle, and that conflict with the voice and gestural commands from the driver of the motor vehicle, and generate, after comparison of said data with reference data, at least one instruction to at least one interior lighting module to control one of the at least two lights, wherein the comparison of the data with reference data includes comparing the data with a reference voice and a reference gestural sequence.

2. The device according to claim 1, wherein the at least one detector is configured to detect the plurality of voice and gestural commands, executed by at least one occupant of the vehicle, in specific zones of the vehicle interior targeted by said at least one detector, the specific zones including at least a driver zone, a front passenger zone, and a rear passenger zone.

3. The device according to claim 2, wherein the gestural commands include a plurality of gestures forming a determined gestural sequence.

4. The device according to claim 3, wherein the gestural sequence is defined by at least one of its vertical, horizontal, and diagonal orientation, and its speed of execution.

5. The device according to claim 1, wherein the at least one detector is further configured to acquire, from a network, data conveying said commands.

6. The device according to claim 1, wherein: the at least one detector includes a plurality of distinct detectors configured to at least detect an interior lighting command, analyze the interior lighting command, and transmit data representative of said interior lighting command, the electronic controller is linked to said plurality of distinct detectors and configured to process a plurality of data representative of a plurality of commands, and transmit at least one resulting instruction to at least one lighting module, and the device further includes:

an upstream communicator configured to circulate the representative data transmitted by at least one detection module to the input of the electronic controller, and a downstream communicator configured to circulate at least one instruction output from the electronic controller to at least one light source and to form a multiplexed network.

7. The device according to claim 6, wherein the plurality of detectors are configured to record a plurality of commands for which the performance sequence forms said interior lighting command.

8. The device according to claim 6 wherein that the electronic controller is configured to merge and synthesize the data representative of a plurality of commands into one or more resulting instructions.

9. The device according to claim 8, wherein the electronic controller is configured to prioritize the data from the different detectors, and to establish one or more resulting instructions on the basis of a selection of the data from the different detectors.

10. The device according to claim 6, wherein the electronic controller is configured to compare the data representative of a plurality of commands with reference data and determine according to this comparison, whether the conditions for triggering a lighting function are met.

11. The device according to claim 6, wherein the upstream and downstream communicators include a common multiplexed network.

12. A control method with voice and gestural recognition for an interior lighting of a motor vehicle, following a voice and gestural command from at least one occupant in a specific detection zone of the vehicle interior, the method comprising:

detecting at least a voice sequence and at least one of a two-dimensional (2D) or three-dimensional (3D) images of a gestural sequence from a driver of the motor vehicle, analyzing the voice sequence and the gestural sequence to generate data representative of the voice and gestural command from the driver of the motor vehicle, merging and prioritizing said representative data over data generated by other voice and gestural commands from at least one other vehicle occupant that are simultaneous with the voice and gestural commands from the driver of the motor vehicle, and that conflict with the voice and gestural commands from the driver of the motor vehicle, transmitting said representative data to at least one electronic controller, via a communication network, processing said data representative of the voice and gestural command from the driver of the motor vehicle. and transmitting, if triggering conditions are met, via a multiplexed communication network, of at least one instruction controlling at least one light source of the vehicle, wherein the processing of said data includes:

merging said representative data in order to obtain merged representative data, comparing said merged representative data relating to said detected voice and gestural sequence with a reference voice and a gestural sequence stored in a database, and making it possible to determine whether conditions for triggering a lighting function are met.

13. The control method according to claim 12, wherein, in the case of a command by gestural recognition, there is implemented, in the analysis step, a gestural sequence detection and an image acquisition that are distinct and interact with one another, said image acquisition only occurring when a detector has detected the beginning of a gesture that can initiate a gestural sequence.

14. The control method according to claim 13, wherein, in the case of a command by gestural recognition, there is implemented, in the analysis step, an image acquisition which continuously recovers images targeted on the detection zone.

15. The device according to claim 5, wherein:

the at least one detector includes a plurality of distinct command detectors, configured to at least detect an interior lighting command, analyze the interior lighting command, and transmit data representative of said interior lighting command, the electronic controller is linked to said detectors and is configured to process a plurality of data representative of a plurality of commands, and transmit at least one resulting instruction to at least one lighting module, and the device further includes:

an upstream communicator configured to circulate the representative data transmitted by the at least one detector to the input of the electronic controller, a downstream communicator configured to circulate at least one instruction output from the electronic controller to at least one light source and to form a multiplexed network.

16. The device according to claim 7, wherein that the electronic controller is configured to merge and synthesize the data representative of a plurality of commands into one or more resulting instructions.

17. The device according to claim 9, wherein the electronic controller is configured to compare the data representative of a plurality of commands with reference data and determine according to this comparison, whether the conditions for triggering a lighting function are met.

18. The device according to claim 10, wherein the upstream and downstream communicators include a common multiplexed network.

19. The control method according to claim 12, wherein, in the case of a command by gestural recognition, there is implemented, in the analysis step, a gestural sequence detection and an image acquisition that are distinct and interact with one another, said image acquisition being performed only when a detector has detected a beginning of a gesture that can initiate a gestural sequence.

* * * * *